United States Patent [19]

Burg

[11] Patent Number: 4,890,564
[45] Date of Patent: Jan. 2, 1990

[54] EXTENDED BOW AND CONTROLLABLE AIR CUSHION AIR RIDE BOAT HULL

[76] Inventor: Donald E. Burg, 15840 SW. 84th Ave., Miami, Fla. 33157

[21] Appl. No.: 183,588

[22] Filed: Apr. 19, 1988

Related U.S. Application Data

[63] Continuation-in-part of Ser. No. 737,403, Nov. 1, 1976, abandoned, Ser. No. 818,303, Jul. 25, 1977, Pat. No. 4,165,703, Ser. No. 69,771, Aug. 27, 1979, abandoned, Ser. No. 207,789, Nov. 17, 1980, abandoned, Ser. No. 269,908, Jun. 3, 1981, Pat. No. 4,392,445, Ser. No. 289,769, Aug. 3, 1981, abandoned, Ser. No. 343,287, Jan. 27, 1982, abandoned, Ser. No. 458,738, Jan. 17, 1983, abandoned, Ser. No. 465,670, Feb. 10, 1983, abandoned, PCT US83/01067, filed Jul. 11, 1983, published as WO85/00332, Ser. No. 584,728, Feb. 29, 1984, Pat. No. 4,587,918, Ser. No. 844,529, Mar. 27, 1986, Pat. No. 4,735,164, and Ser. No. 862,300, May 12, 1986, Pat. No. 4,739,719.

[51] Int. Cl.[4] .................................... B63B 1/38
[52] U.S. Cl. .................................... 114/67 A; 180/126
[58] Field of Search .................. 114/67 A, 289, 290, 114/285, 286, 287; 180/126, 127, 128

[56] References Cited

U.S. PATENT DOCUMENTS

| | | | |
|---|---|---|---|
| 1,819,216 | 8/1931 | Warner | 114/67 A |
| 3,027,860 | 4/1962 | Priest | 114/67 A |
| 3,067,711 | 12/1962 | Hesher et al. | 114/290 |
| 3,146,752 | 9/1964 | Ford | 114/67 A |
| 3,476,069 | 11/1969 | Mantle et al. | 114/67 A |
| 3,532,180 | 10/1970 | Ford | 180/126 |
| 3,742,888 | 7/1973 | Crowley | 114/67 A |
| 3,752,253 | 8/1973 | Hopkins et al. | 180/127 X |
| 4,029,036 | 6/1977 | Magnuson | 114/67 A |
| 4,046,217 | 9/1977 | Magnuson | 180/126 |
| 4,228,752 | 10/1980 | Sladek et al. | 114/67 A |

Primary Examiner—Sherman D. Basinger
Attorney, Agent, or Firm—Robert J. Van Der Wall

[57] ABSTRACT

An improved performance and high stability marine surface vessel that is supported at least in part by a pressurized gas cushion where the pressurized gas is supplied to the gas cushion normally by mechanical apparatus such as a powered blower. The pressurized gas cushion is restrained, at least partially, by a recess built into the underside of the hull with significant advancements including a forwardly extending bow member that helps lift the bow over rough seas, water impact relief openings in the side hulls, movable and optionally remotely controllable stern seal member sections that allow control of recess gas cushion depth, pressure and other gas cushion characteristics, and a control system for a movable stern seal member. The advancements also include a forward movable seal attached structure that greatly increases movable seal life. The above advancements may be used singularly or in various combinations.

102 Claims, 2 Drawing Sheets

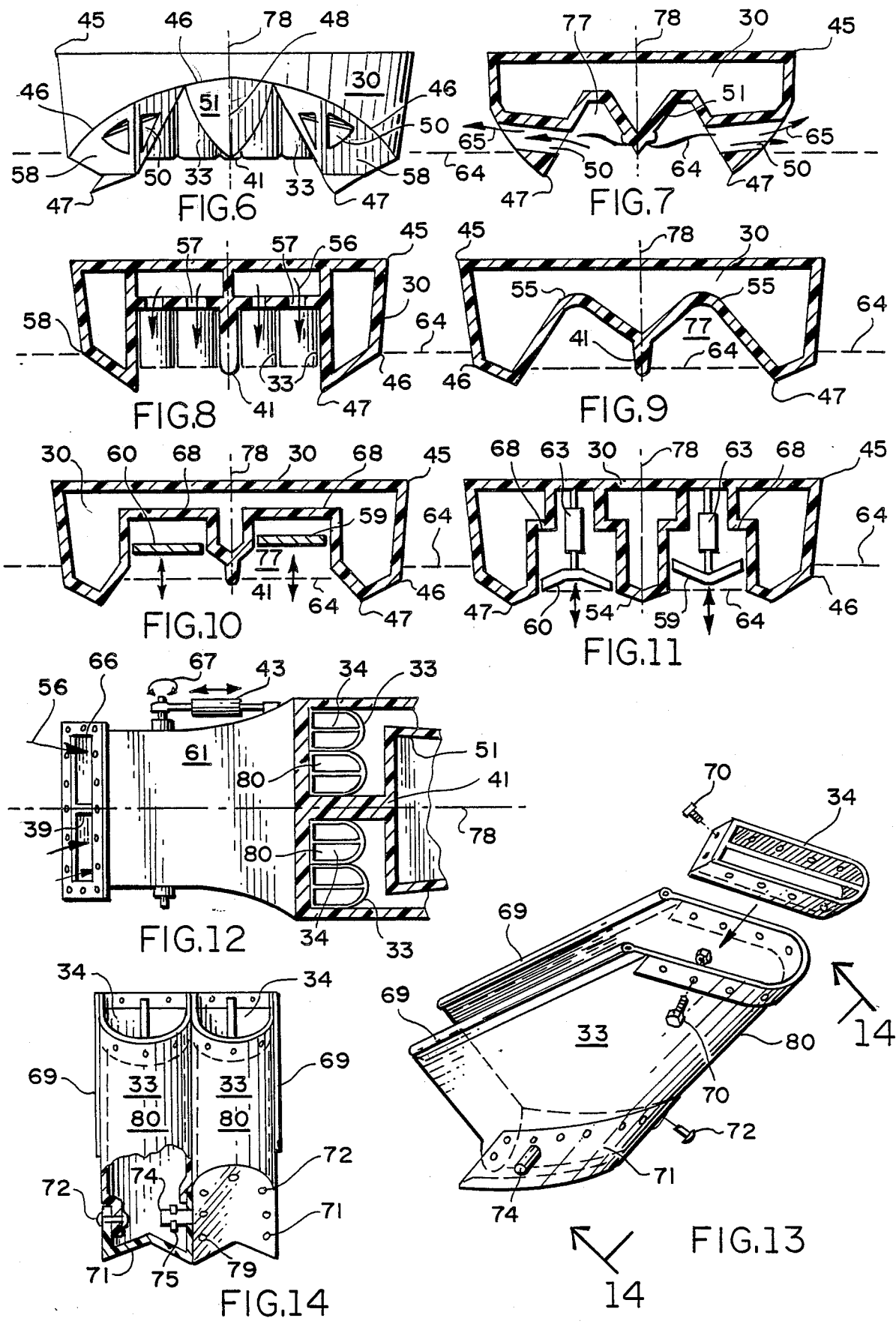

EXTENDED BOW AND CONTROLLABLE AIR CUSHION AIR RIDE BOAT HULL

CROSS REFERENCE TO OTHER APPLICATIONS

This application is a continuation-in-part to applicant's earlier applications, Ser. No. 737,403 filed Nov. 1, 1976, now abandoned; Ser. No. 818,303 filed July 25, 1977, now U.S. Pat. No. 4,165,703 issued Aug. 27, 1979; Ser. No. 069,771 filed Aug. 27, 1979, now abandoned; Ser. No. 207,789 filed Nov. 17, 1980, now abandoned; Ser. No. 269,908 filed June 3, 1981, now U.S. Pat. No. 4,392,445 issued July 12, 1983; Ser. No. 289,769 filed Aug. 3, 1981, now abandoned; Ser. No. 343,287 filed Jan. 27, 1982, now abandoned; Ser. No. 458,738 filed Jan. 17, 1983, now abandoned; Ser. No. 465,670 filed Feb. 10, 1983, now abandoned; International Application No. PCT/US83/010067 filed July 11, 1983 published as WO85/00332; Ser. No. 584,728 filed Feb. 29, 1984, now U.S. Pat. No. 4,587,918 issued May 13, 1986; Ser. No. 844,529 filed Mar. 27, 1986, now U.S. Pat. No. 4,735,164 issued Apr. 5, 1988; and Ser. No. 862,300 filed May 12, 1986, to issue as U.S. Pat. No. 4,739,719 on Apr. 26, 1988.

FIELD OF THE INVENTION

This invention relates to the field of marine surface vessels supported at least in part by a pressurized gas cushion where the pressurized gas is supplied to the cushion primarily by artificial means. The pressurized gas cushion is restrained, at least partially, by a recess built into the underside of the hull with particular improvements relating to a forwardly extending bow member that helps lift the bow over rough seas, water impact relief ports in the side hulls, height adjustable stern seal member sections that allow adjustment and control of recess gas cushions, and flexible seal tip attachment members that greatly increase flexible seal life.

BACKGROUND OF THE INVENTION

The instant invention is a further improvement to applicant's earlier inventions in this field that are generally entitled "Air Ride Boat Hulls". All of these inventions require the introduction of pressurized gas into a recess in the underside of the boat hull to improve operating speeds and load carrying capabilities due to increased efficiencies, provide superior ride qualities, and provide improved stability.

Much of the background for the current invention is discussed in some detail in applicant's earlier U.S. Pat. Nos. 4,392,445 and 4,587,918 and most particularly in to be issued U.S. Pat. No. 4,739,719. The latter patent will issue Apr. 26, 1988. The instant invention offers significant advancements over the just mentioned U.S. Patents of applicant. These advancements are discussed in detail in the following sections.

SUMMARY OF THE INVENTION

The object of the present invention is to offer the advantages of previous Air Ride boat hull concepts, as discussed in U.S. Pat. Nos. 4,392,445, 4,587,918, and 4,739,719, coupled with further improvements in stability, ride quality, performance, and flexible seal operation and life. Advances include the use of a forwardly extending bow, located primarily between the sidehulls, that helps lift the bow over encountered waves, especially when the encountered waves are large swells. Other features of this bow are that its main portions terminate forward of a flexible or movable forward seal member and it then transforms into a gas cushion divider that has substantially parallel surfaces on either side. The parallel sided divider passes through a flexible or movable forward seal member where the divider's substantially parallel sides are conducive to free seal movement.

A further improvement involves the use of wave impact venting openings located in the sidehulls. These openings allow water wakes and/or spray that is shed by the forward bow to escape without impacting the sidehulls. This feature not only reduces wave impact forces but also reduces sidehull wetted area friction effects.

An additional improvement involves the application of a rigid or semi-rigid structure to the water contacting portions of forward flexible seal elements. These structures would normally be a rigid or a semi-rigid material, such as aluminum, fiberglass or hard rubber, and would greatly enhance the life of flexible seal elements.

It is a further object of the preceding to have a rigid or semi-rigid structure, that is attached to a flexible seal element, be shaped to cause it to ride proximal to the water surface. The latter promotes good sealing of recess pressurized gas with minimal seal resistance.

Another important feature of the instant invention is to provide movable seal elements that make up portions of the recess rear seal. These movable seal elements can be used to control the level of gas and hence gas pressure in individual gas cushions and hence vessel roll, pitch, and yaw characteristics.

An additional object of the invention is to provide for rapid controlled movement of the rear movable seal elements so that peak pressures generated by wave movement inside the gas cushion can be relieved and thereby produce a smoother ride.

A further object is to provide for sensing systems to sense hull movements or orientation and/or gas cushion pressures with readings from the sensing systems fed into a controller, normally a programmed microprocessor, that then outputs directions to an aft movable seal element actuator control and/or powering system.

It is a further object of the invention that these adjustable seal elements would normally have shape, as viewed in a vertical transverse plane that passes through an adjustable seal element, which results in reduced wave impact forces on these elements.

The invention will be better understood upon reference to the drawings and detailed description of the invention which follow in which:

BRIEF DESCRIPTION OF THE DRAWINGS

FIG. 6 is a forward or bow on view of the hull as taken through line 6—6 of FIG. 3. Shown are a center hull forward, sidehulls including wave impact relief ports or openings, and flexible seals.

FIG. 7 is a cross section, as taken through line 7—7 of FIG. 3, that shows the wave impact vents or openings in the sidehulls.

FIG. 8 presents a cross section, as taken through line 8—8 of FIG. 3, that shows flexible seal elements and a substantially paral lel sided divider, that has extended rearwardly from the forward bow, where the parallel sides of the divider do not impede movement of adjacent flexible seal elements.

FIG. 9 shows a typical cross section, as taken through line 9—9 of FIG. 3, of a hull to the preferred embodiment of the instant invention. This cross section shows the double inverted-V shape which is a most desirable variation.

FIG. 10 is a cross section, as taken through line 10—10 of FIG. 3, that gives details of a transverse section in way of a forward portion of an adjustable rear seal element. Note that the adjustable seal elements are substantially planar in this section which is preferred to allow use with a horizontal hinge located just forward of this section.

FIG. 11 presents a cross section, as taken through line 11—11 of FIG. 4, that shows actuators and the shape of typical adjustable rear seal elements. Note that, although the port seal element is shown as an inverted-V and the starboard seal element in V shape for illustrative purposes, port and starboard elements would normally be identical in actual installations.

FIG. 12 is a cross sectional view, as taken through line 12—12 of FIG. 4, that shows the top of a blower discharge duct, including the blower attachment flange, and the top of four individual seal elements.

FIG. 13 shows a typical flexible seal element in an isometric view. Shown are a seal top cap plate, seal side attachment beads, and a seal attachment member, normally rigid or semi-rigid, on the lower portion of the seal. The seal attachment member may include a locating or positioning dowel, shown, that extends into an adjacent seal element attachment member.

FIG. 14 presents a frontal view of two flexible seal members, ready for installation, which shows one seal attachment member in cross section. In this case, a locating pin or dowel extends from the seal attachment member on the left into the one shown in cross section on the right. Since some relative movement between the seals is desirable, a large clearance hole for the dowel is provided in the seal on the right. Note that the seal attachment member is designed to plane or otherwise skip across or near the water surface for minimum resistance and minimum pressurized gas leakage. The water contacting seal attachment members greatly increase seal life since most seal wear occurs at the water contacting tips of the flexible seal elements.

DETAILED DESCRIPTION

With reference to each of the aforementioned Figures in turn, and using like numerals to designate similar parts throughout the several views, a preferred embodiment and several alternative embodiments will now be described.

Figure 1:
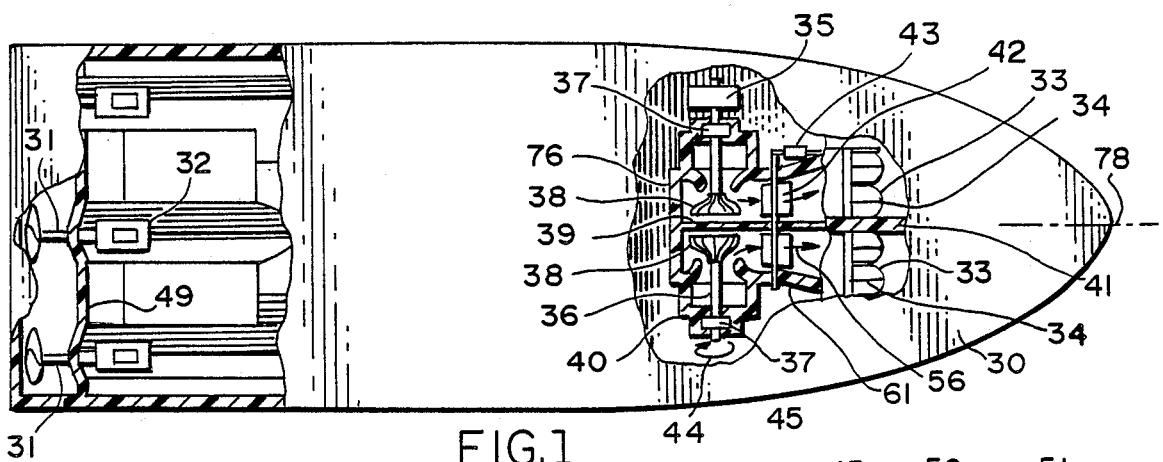
FIG. 1 presents a top partial cutaway view of a boat hull to the present invention that shows typical engine and propulsor, surface propeller drives in the example shown, installations and details of a dual wheel blower including the blower's drive engine and discharge ducts that discharge against the back side of flexible seals. Note that the use of separate blower wheels allows the advantage of separate and independent gas cushions in the the underside of the hull.

FIG. 1 discloses the top view of a boat to the inventive hull 30 and its deck line 45 that is partially removed to show three main propulsor engines 32 and propulsor drives 31 with the propulsor drives 31 mounted on drive mount transom 49. Further shown is the hull centerline 78, blower 76, blower housing 40, blower shaft 36, blower wheels or impellers 38, blower wheel divider plate 39 blower rotation arrow 44, air or other gas flow arrows 56, blower drive motor 35, blower discharge duct 61, discharge duct valve 42, valve actuator 43, flexible seals 33, seal top or cap plate 34, and forward bow rearward extension seal separator 41.

Figure 2:
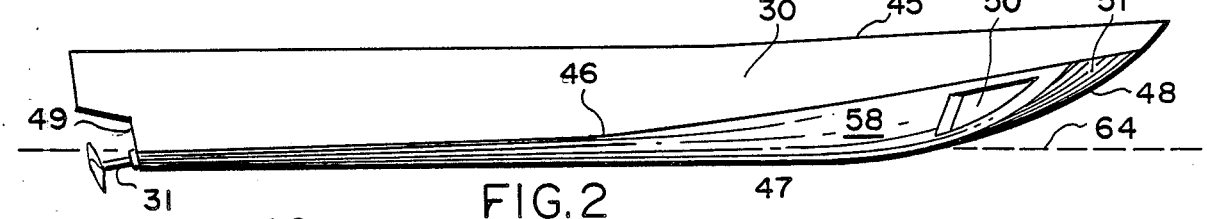
FIG. 2 shows a profile view of a preferred embodiment of the invention which includes a wave impact relief port located in a forward portion of the starboard sidehull shown. The fact that this hull is very appealing to the eye—it looks much like a standard high speed monohull even though it has flexible seals at the forward portion of the gas cushion—is an intended purpose of the prime version of the present invention.

FIG. 2 presents a profile view of the inventive hull 30 of FIG. 1 which shows the deck line 45, chine 46, drive mount transom 49, propulsor drive 31, sidehull 58, sidehull keel 47, forward bow 51, and water impact vent or opening 50 in sidehull 58. Note the fine pointed bow that is possible with this concept.

Figure 3:
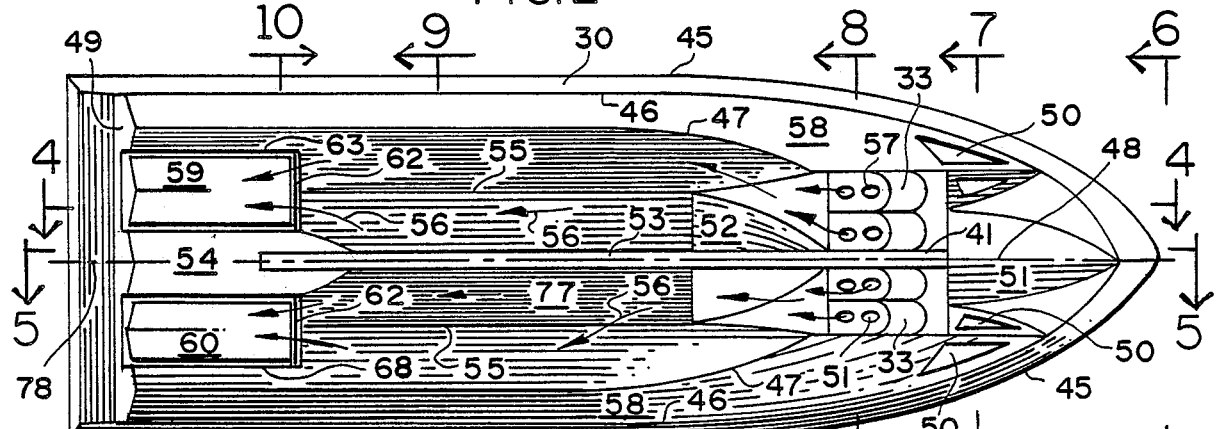
FIG. 3 is a bottom or fish eye view of the preferred embodiment of the invention. Shown are a bow that extends forward of the flexible seal element and hence adds to forward lift when large waves, particularly swells, are encountered and the wave impact relief openings in the sidehulls. Note that a substantially parallel sided center divider is actually an extension of the forward bow and extends aft through the flexible seal elements. Also shown are the gas cushion flexible seals forward and the adjustable portions of the gas cushion rear seal.

FIG. 3 is a bottom view of the hull 30 which shows the hull centerline 78, deck line 45, chines 46, sidehulls 58, sidehull keels 47, divider 53, air chamber bow 52, peak of chamber inverted-V's 55, water impact relief openings in sidehulls 50, forward bow 51, bow member substantially parallel sided divider 41, air flow arrows 56, air inlet openings 57, and flexible seal or otherwise movable seals 33. In the preferred embodiment of the instant invention, the sidehull keels 47 diverge aft of the forward seals 33 to thus enlarge recess or gas cushion 77 width thus providing for greater cushion lift. Also shown are the controllable or movable aft seal elements 59 (starboard) and 60 (port) as located proximal their hull insets 68 and attached by hinges 62. Note that, in this particular variation, the controllable aft seal elements 59, 60 are located either side of fixed aft seal member 54. The aft seal member 54 is preferbably nonplanar, as viewed in a vertical transverse plane of the hull, over at least part of its water contacting portions. It is also possible to extend an aft seal member or members 54 over a majority of recess 77 width if the movable aft seal elements 59,60 are either miminized or not used.

Figure 4:
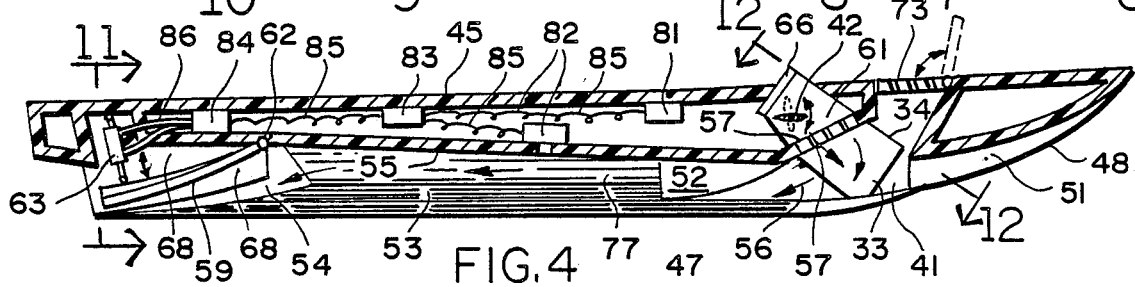
FIG. 4 presents a cross sectional view, as taken through line 4—4 of FIG. 3, that shows more details of a flexible seal element installation, a seal removal hatch in the closed position, a blower discharge valve, and details of operation of an adjustable portion of an aft seal member.

FIG. 4 is a cross sectional view, as taken through line 4—4 of FIG. 3, that shows a forward movable seal 33, seal attachment plate 34, hatch 73 for seal removal as shown in the closed position, blower discharge duct 61, blower flange 66, blower discharge valve 42, and air flow arrows 56. Also shown are a forward bow 51, forward bow keel 48, sidehull keel 47, forward bow extension seal separator member 41, secondary bow 52 located in gas or air cushion 77, gas cushion divider 53, and air inlet openings 57. Also shown are fixed rear seal 54, starboard controllable seal element 59, seal element actuator 63, seal element locating recess 68, and seal element hinge 62.

FIG. 4 also shows hull motion sensor 81 which is normally a pilot gyroscope and/or accelerometer either of which are commercially available and therefore conventional, recess gas cushion pressure sensor 82 which is normally a commercially available pressure transducer and therefore conventional, controller 83 which is most commonly a commercially available microprocessor and therefore conventional, and connecting lines or cables 85. Also shown is an actuator control device or module 84 which is most commonly a hydraulic or pneumatic control module system including such items as pumps, valves, accumulators, and the like, not shown to simplify the drawings, that are commercially available and therefore conventional, actuator control lines 86 which may be tubing, electrical lines, or the like, and actuators 63. A variety of actuator systems or devices may be used and included, among others, are pneumatic or hydraulic cylinders, gas bags, electric motors, or any other devices suitable for generating and actuator force. The connectors 63 may also be passive systems such as shock absorbers, gas springs or bags that maky be supplied with pressurized gas from a gas cushion gas supply device such as blower 76 of FIG. 1, or the like and the complete system may include both active and passive connectors 63. A microprocessor 83 is, of course, normally programmed with a software program and there may further be means to adjust microprocessor outputs from a remote controller, not shown but normally mounted in the pilothouse.

Figure 5:
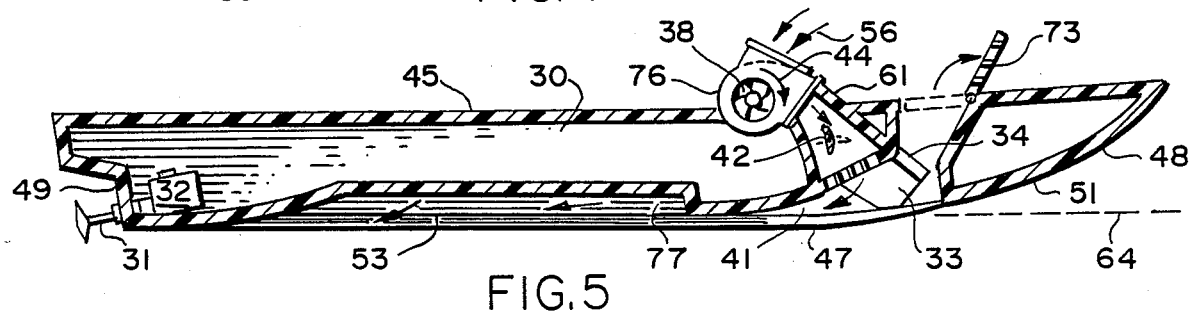
FIG. 5 is a cross sectional view, as taken through line 5—5 of FIG. 3, of a boat to the present invention that shows more details of the blower and propulsor and its engine installation.

FIG. 5 is a cross sectional view, as taken through line 5—5 of FIG. 3 where line 5—5 is slightly to starboard of the hull centerline 78, of a hull 30 that shows a deck 45, forward bow 51, forward bow keel 48, forward bow rearwardly extending seal divider 41, seal removal hatch 73 in the open position, sidehull keel 47, drive mount transom 49, propulsor drive 49, propulsor drive motor 32, divider 53, and gas chamber or cushion 77. Also shown is a blower 76, blower wheel 38, blower discharge duct 61, blower rotational arrow 44, blower discharge valve 42, flexible or movable seal 33, and seal top or cap plate 34.

FIG. 6 is a frontal view of the air ride boat hull 30, as seen from line 6—6 of FIG. 3, that shows a forward bow 51, forward bow keel 48, hull centerline 78, chine 46, deck line 45, sidehulls 58, sidehull water impact relief openings 50, forward movable seals 33, and forward bow rearward extending seal separator 41.

FIG. 7 is a cross sectional view, as taken through line 7—7 of FIG. 3, that shows waterline 64 and water impact flow arrows 65 that show water spray or waves that primarily originate from forward bow 51 where much of the water flow 65 vents or leaves through sidehull openings 50. Also shown is gas cushion 77, hull centerline 78, sidehull keels 47, and deck line 45.

FIG. 8 is a cross sectional view, as taken through line 8—8 of FIG. 3, that shows the hull 30, deck line 45, air flow arrows 56, air openings 57, hull centerline 78, sidehull keels 47, and chines 46. Also shown are forward seals 33, and forward bow rearwardly extending seal divider 41. Note that, in the preferred embodiment of the instant invention, both the inside of the sidehulls 58 and the seal divider 41 have substantially parallel vertical surfaces to facilitate easy movement of adjacent seals 33.

FIG. 9 presents a typical midship cross sectional view of a hull 30, as taken through line 9—9 of FIG. 3, which shows the deck line 45, chines 46, sidehull keels 47, gas chamber 77, inverted-V peaks 55, gas cushion divider 41, hull centerline 78, and waterlines 64. The inverted-V peaks 55 are not necessary to function of the invention and planer or shaped surfaces may be utilized as upper surface shapes for the recess 77. Further, it is not necessary that the inverted-V peaks 55 physically intersect and they are defined as intersecting if intersections of projections of the angled recess sides occur below a deck line 45.

FIG. 10 is a cross sectional view of a hull 30, as taken through line 10—10 of FIG. 3, that most importantly shows forward portions of movable or controllable aft seal members, stardboard 59 and port 60, as they are optionally located in insets 68 in the hull 30 gas cushion recess 77. In this preferred embodiment of the instant invention, the movable aft seal members 59,60 are substantially planar in their forward sections to facilitate mounting to their forward hinges, or other attachment hardware, where the hinges are shown and discussed under FIG. 3 preceding. Other items shown in FIG. 10 include the deck line 45, gas cushion or recess 77 divider 41, sidehull keels 47, chines 47, hull centerline 78 and waterlines 64.

FIG. 11 is a cross sectional view of a hull 30, as taken through line 11—11 of FIG. 4, which notably shows aft portions of movable or controllable aft seal members, starboard 59 and port 60, as they are optionally located in insets 68 in the hull gas cushion recess 77. Note that the starboard movable aft seal member 59 has changed from the forward planar section of FIG. 10 to a V shape and the port movable aft seal member 60 to an inverted-V shape. The shaped members 59,60 shown in FIG. 11 are the preferred embodiments of the instant invention since they present the best wave impact shock reducing shaped compared to the planar shapes. It is preferable, of course, to use indentically shaped members both port 60 and starboard 59 and the use of two different shapes here was done for convenience of illustration only. Further, it obviously is possible to utilize constantly shaped, fore to aft, movable aft seal members 59,60 where such shaped can be angled, curved, planar, or combinations of the above. Also shown are typical actuators 63 where such actuators may be controlled so that they can control hull 30 motions. Further items shown are the deck line 45, chines 46, sidehull keels 47, fixed aft seal section 54, and waterline 64.

FIG. 12 presents a partial top view of the blower discharge duct 61 area, as taken through line 12—12 of FIG. 4, that shows a blower attachment flange 66, blower discharge air flow arrows 56, blower discharge air splitter plate 39, blower discharge valve actuator 43, and blower discharge valve rotation arrow 67. Also shown are seal top plates 34, seals 33, and a seal separator 41 that in the preferred embodiment is an extension of a forward bow 51.

FIG. 13 illustrates a typical forward seal element assembly 80 that includes seal member 33, optional side bead fasteners 69 that slide into tracks in a hull, not shown. Further shown is a seal element top plate 34, fasteners 70, seal attachment member or wear plate 71, rivet type fasteners 72, and pin or dowel 74. The use of such items as a pin or dowel 74, or other contacting means, is much preferred as this allows attachment of adjacent seals 33 normally by way of their seal attachment members 71. This latter procedure is designed to provide loose fitting constraintment between adjacent seal elements 33 so that seal attachment members 71 will remain side-by-side.

FIG. 14 is a frontal view of two adjacent seal element assemblies 80 with the left hand assembly shown in partial cut away section. Importantly shown are a dowel 74 that extends from the right seal attachment member 71 through an opening 79 in the left attachment member 71 and is restrained by snap ring 75. The opening 79 is made oversize to allow freedom of movement between the adjacent seal element assemblies 80. Also shown in this figure are the seal top plates 34, seal members 33, seal side beads 69, and rivets 72. Note that the bottoms of the seal attachment members 71 are shaped, in this case as inverted-V's, to allow good water contact as planing surfaces in this preferred embodiment.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by appended claims, which are the sole definition of the invention.

What is claimed is:

1. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:

stabilizing, load carrying catamaran like sidehulls beginning at a forward portion of and extending downwardly from the hull, said sidehulls have keels that are substantially parallel to each other over at least part of their forward portions and said keels diverge aft of their forward portions, and a forwardly extending bow member disposed, at least in part, both inwardly of a sidehull and forwardly of said gas cushion forward movable seal, wherein said forwardly extending bow member is connected to a seal separator member that, at least in part, passes between elements of said gas cushion forward movable seal.

2. The hull of claim 1 wherein a sidehull includes an opening that penetrates through from inside to outside of the sidehull and that is disposed, at least in part, forward of the gas cushion forward movable seal.

3. The hull of claim 1 wherein said sidehulls have surfaces that are substantially parallel to each other over at least part of their forward portions.

4. The hull of claim 1 wherein said separator of said seal elements has substantially parallel sides over at least a portion of its length that is proximal portions of said forward movable seal.

5. The hull of claim 1 wherein the recess includes at least one substantially inverted-V shape as formed by an intersection of recess surfaces when viewed in a vertical transverse plane of the hull with said intersection disposed below a deck line of the hull.

6. The hull of claim 1 wherein the recess is comprised of substantially separate compartments with at least two compartments supplied by separate gas pressurizing means with said separate gas pressurizing means powered by a common prime mover.

7. The hull of claim 6 wherein the improvement further comprises separate blower wheels on a common drive shaft that are separated by structure with the separate blower wheels supplying different compartments thereby creating substantially independent, but commonly powered, gas pressurizing means for gas cushions in the compartments.

8. The hull of claim 1 wherein the recess is composed of at least two substantially separate compartments that are separated by a divider member that extends over a majority of a length of the recess.

9. The hull of claim 1 which further comprises at least one bow member proximal the recess.

10. The hull of claim 1 wherein an element of a movable seal includes a substantially rigid top cap that is fastened to a forward upper portion of said seal element.

11. The hull of claim 1 wherein an element of the forward movable seal includes a side bead fastener whereby said side bead fastener slides into a track where said track is fastened to the hull and extends over a length of a rear portion of said seal element when said seal element is installed.

12. The hull of claim 1 wherein elements of said movable seal may be removed, with the boat waterborne, by on-board personnel through a forward deck opening, with said deck opening at least partially disposed in a portion of a deck that extends forwardly of a seal element.

13. The hull of claim 1 wherein a valve is disposed in a blower discharge duct between a blower and a movable seal element thereby allowing control of an amount of blower discharge gas.

14. The hull of claim 1 wherein the improvement comprises a hull shaped member that makes up a portion of said pressurized gas recess boundary.

15. The hull of claim 1 which further includes at least one substantially rigid aft gas sealing member, said sealing member including at least one substantially inverted V shape as formed by an intersection of recess surfaces when viewed in a vertical transverse plane of the hull with said intersection disposed below a deck line of the hull.

16. The hull of claim 1 which further includes an aft movable seal member where said aft movable seal member, when viewed in at least one vertical transverse plane of the hull,
   contains surfaces that are angled to horizontal on its underside over a majority of its width.

17. The hull of claim 1 wherein the recess is composed of compartments that are separate over at least a majority of their length with at least one of the separate compartments having an aft movable seal member.

18. The hull of claim 17 which further includes an aft movable seal member where positioning of the aft movable seal member is directed, at least partially, by outputs from a controller based, at least in part, on said controller's inputs from a sensor that senses recess gas pressure.

19. The hull of claim 1 which further includes an aft movable seal member where positioning of the aft movable seal member is directed, at least partially, by outputs from a controller based, at least in part, on said controller's inputs from a sensor that senses hull orientation.

20. The hull of claim 1 wherein the improvement further comprises a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

21. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:
  stabilizing, load carrying catamaran like sidehulls beginning at a forward portion of and extending downwardly from the hull, said sidehulls have keels that are substantially parallel to each other over at least part of their forward portions and said keels diverse aft of their forward portions, two or more recess compartments that are longitudinally divided over a majority of recess length, and wherein at least one of the recess compartments has an aft movable seal member.

22. The hull of claim 21 wherein said gas cushion aft movable seal member, when viewed in a vertical transverse plane of the hull, includes an inverted-V shape in its underside.

23. The hull of claim 21 wherein positioning of the aft movable seal member is directed, at least partially, by outputs from a controller based, at least in part, on said controller's inputs from a sensor that senses recess gas pressure.

24. The hull of claim 21 wherein positioning of the aft movable seal member is directed, at least partially, by outputs from a controller based, at least in part, on said controller's inputs from a sensor that sense hull orientation.

25. The hull of claim 21 wherein at least two recess compartments are supplied by separate gas pressurizing means with said separate gas pressurizing means powered by a common prime mover.

26. The hull of claim 21 wherein at least two recess compartments are separated by a divider member that extends over a majority of a length of the recess.

27. The hull of claim 21 wherein the improvement further comprises separate blower wheels on a common drive shaft that are separated by structure with the separate blower wheels supplying different compartments thereby creating substantially independent, but commonly powered, gas pressurizing means for gas cushions in the compartments.

28. The hull of claim 21 which further includes at least one fixed aft gas sealing member, said fixed sealing member including, at least partially, surfaces angled to horizontal on a majority of its lower water contacting portions when such angled surfaces are viewed in a vertical transverse plane of the hull.

29. The hull of claim 21 which further includes
a forwardly extending bow member disposed, at least in part, both inwardly of a sidehull and forwardly of said gas cushion forward movable seal, wherein said forwardly extending bow member is connected to a seal separator member that, at least in part, passes between elements of said forward movable seal, and wherein said separator of said forward movable seal elements has substantially parallel sides over at least a portion of its length that is proximal portions of said forward movable seal.

30. The hull of claim 21 wherein said gas cushion aft movable seal member, when viewed in at least one vertical transverse plane of the hull, is angled to horizontal over a majority of its width.

31. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:
  stabilizing, load carrying catamaran like sidehulls beginning at a forward portion of and extending downwardly from the hull, a forwardly extending bow member disposed, at least in part, both inwardly of a sidehull and forwardly of said gas cushion forward movable seal, wherein said forwardly extending bow member is connected to a seal separator member that, at least in part, passes between elements of said gas cushion forward movable seal, and wherein an element of the forward movable seal includes a side bead fastener whereby said side bead fastener slides into a track where said track is fastened to the hull and extends over a length of a rear portion of said seal element when said seal element is installed.

32. The movable seal of claim 31 which further comprises attached structure proximal said forward movable seal element lower portions, said attached structure including a water contacting surface, and said attached structure being in movable attachment with an attached structure on an adjacent seal element.

33. The sidehulls of claim 31 where said sidehulls have keels that are substantially parallel to each other over at least part of their forward portions and said keels diverge aft of their forward portions.

34. The sidehulls of claim 31
  where said sidehulls have inside surfaces that are substantially parallel to each other over at least part of their forward portions that are proximal the forward movable seal and wherein said separator of said seal elements has substantially parallel sides over at least a portion of its length that is proximal portions of the forward movable seal.

35. The hull of claim 31 wherein the recess is composed of compartments that are separate over at least a majority of their length with at least one of the separate compartments having an aft movable seal member.

36. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:
  stabilizing, load carrying catamaran like sidehulls beginning at a forward portion of and extending downwardly from the hull, said forward movable seal positioned proximal forward portions of said sidehulls, a forwardly extending bow member disposed, at least in part, forward of said forward movable seal, and a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

37. The hull of claim 36 wherein said sidehulls have keels that diverse aft of said forward movable seal.

38. The hull of claim 36 wherein said forwardly extending bow member is connected to a seal separator member that, at least in part, passes between elements of said forward movable seal, and wherein said separator of said elements has substantially parallel sides over at least a portion of its length that is proximal portions of said forward movable seal.

39. The hull of claim 36 wherein said sidehulls have surfaces that are substantially parallel to each other over at least part of their forward portions.

40. The hull of claim 36 wherein a sidehull includes an opening that penetrates through from inside to outside of the sidehull and that is disposed, at least in part, forward of
the gas cushion forward movable seal.

41. The hull of claim 36 wherein the recess includes at least one substantially inverted-V shape as formed by an intersection of recess surfaces when viewed in a vertical transverse plane of the hull with said intersection disposed below a deck line of the hull.

42. The hull of claim 36 wherein the improvement further comprises two or more recess compartments that are longitudinally divided over a majority of recess length.

43. The hull of claim 42 wherein the improvement further comprises separate blower wheels on a common drive shaft that are separated by structure with the separate blower wheels supplying different compartments thereby creating substantially independent, but commonly powered, gas pressurizing means for gas cushions in the compartments.

44. The hull of claim 36 wherein the improvement further comprises a hull shaped member that makes up a portion of said pressurized gas recess boundary.

45. The hull of claim 36 which further includes at least one movable aft gas cushion sealing member, said movable aft gas cushion sealing member, when viewed in at least one vertical transverse plane of the hull, contains surfaces that are angled to horizontal on its underside over a majority of its width.

46. The hull of claim 45 wherein positioning of the aft movable seal member is directed, at least partially, by outputs from a controller based, at least in part, on said controller's inputs from a sensor that senses recess gas pressure.

47. The hull of claim 45 wherein positioning of the aft movable seal member is directed, at least partially, by outputs from a controller based, at least in part, on said controller's inputs from a sensor that senses hull orientation.

48. The hull of claim 36 wherein said substantially rigid aft gas cushion sealing member includes at least one substantially inverted V shape as formed by an intersection of recess surfaces when viewed in a vertical transverse plane of the hull with said intersection disposed below a deck line of the hull.

49. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:

stabilizing, load carrying catamaran like sidehulls beginning at a forward portion of and extending downwardly from the hull, a forwardly extending bow member disposed, at least in part, both inwardly of a sidehull and forwardly of said gas cushion forward movable seal, and wherein a sidehull includes an opening that penetrates through from inside to outside of the sidehull and that is disposed, at least in part, forward of said gas cushion forward movable seal.

50. The hull of claim 49 wherein said forwardly extending bow member is connected to a seal separator member that, at least in part, passes between elements of said gas cushion forward movable seal.

51. The hull of claim 50 wherein said separator of said seal elements has substantially parallel sides over at least a portion of its length that is proximal portions of said forward movable seal.

52. The hull of claim 49 wherein said sidehulls have keels that are substantially parallel to each other over at least part of their forward portions and said keels diverge aft of their forward portions.

53. The hull of claim 49 wherein the recess includes at least one substantially inverted-V shape as formed by an intersection of recess surfaces when viewed in a vertical transverse plane of the hull with said intersection disposed below a deck line of the hull.

54. The hull of claim 49 wherein the improvement further comprises at least one substantially rigid aft gas cushion sealing member, wherein said aft seal member extends over a majority of recess width and said aft seal member's underside, when viewed in at least one vertical transverse plane of the hull, contains surfaces that are angled to horizontal over a majority of said aft seal member's width.

55. The hull of claim 49 which further includes at least one substantially rigid aft gas sealing member, said sealing member including at least one substantially inverted-V shape as formed by an intersection of recess surfaces when viewed in a vertical transverse plane of the hull with said intersection disposed below a deck line of the hull.

56. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward non-rigid movable seal, the improvement comprising:

stabilizing, load carrying catamaran like sidehulls beginning at a forward portion of and extending downwardly from the hull, said forward movable seal positioned proximal forward portions of said sidehulls, said sidehulls having inside surfaces that are substantially parallel over at least a portion of their length that is proximal said forward movable seal, a substantially rigid forwardly extending bow member disposed, at least in part, forwardly of said gas cushion forward movable seal, wherein said forwardly extending bow member is connected to a seal separator member that, at least in part, passes between elements of said gas cushion forward movable seal, and wherein said seal separator member has substantially parallel sides over at least a portion of its length that is proximal portions of said forward movable seal, and wherein said forwardly extending bow member has a bow like shape and is larger in cross section, as viewed in a vertical transverse plane of the hull that passes through said forwardly extending bow member, than the cross section of said seal separator member as viewed in a vertical transverse plane of the hull that passes through said seal separator element.

57. The hull of claim 56 wherein a sidehull includes an opening that penetrates through from inside to outside of the sidehull and that is disposed, at least in part, forward of the gas cushion forward movable seal.

58. The hull of claim 56 wherein said sidehulls have keels that are substantially parallel to each other over at least part of their forward portions and said keels diverge aft of their forward portions.

59. The hull of claim 56 wherein the recess includes at least one substantially inverted-V shape as formed by an intersection of recess surfaces when viewed in a vertical transverse plane of the hull with said intersection disposed below a deck line of the hull.

60. The hull of claim 56 wherein the recess is composed of at least two substantially separate compartments that are separated by a divider member that extends over a majority of a length of the recess.

61. The hull of claim 56 wherein an element of the forward movable seal includes a side bead fastener whereby said side bead fastener slides into a track where said track is fastened to the hull and extends over a length of a rear portion of said seal element when said seal element is installed.

62. The hull of claim 56 wherein elements of said movable seal may be removed, with the boat waterborne, by on-board personnel through a forward deck opening, with said deck opening at least partially disposed in a portion of a deck that extends forwardly of a seal element.

63. The hull of claim 56 wherein the improvement comprises a hull shaped member that makes up a portion of said pressurized gas recess boundary.

64. The hull of claim 56 which further comprises a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

65. The hull of claim 56 which further includes at least one substantially rigid aft gas sealing member, said sealing member including at least one substantially inverted V shape as formed by an intersection of recess surfaces when viewed in a vertical transverse plane of the hull with said intersection disposed below a deck line of the hull.

66. The hull of claim 56 which further includes an aft movable seal member.

67. The hull of claim 66 wherein said aft movable seal member, when viewed in at least one vertical transverse plane of the hull, contains surfaces that are angled to horizontal on its underside over a majority of its width.

68. The hull of claim 56 wherein the recess is composed of compartments that are separate over at least a majority of their length with at least one of the separate compartments having an aft movable seal member.

69. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:

stabilizing, load carrying catamaran like sidehulls beginning at a forward portion of and extending downwardly from the hull, said forward movable seal positioned proximal forward portions of said sidehulls, said sidehulls have inside surfaces that are substantially parallel over at least part of their forward portions that are proximal the forward movable seal and said sidehull inside surfaces expand outwardly, at least in part, aft of said parallel forward portions, and a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

70. The hull of claim 69 wherein the outwardly expanding inside surfaces of a sidehull, as seen in a vertical transverse plane of the hull, are at least in part angled to vertical aft of said forward parallel surfaces.

71. The hull of claim 69 wherein a sidehull includes an opening that penetrates through from inside to outside of the sidehull and that is disposed, at least in part, forward of the gas cushion forward movable seal.

72. The hull of claim 69 wherein the recess includes at least one substantially inverted-V shape as formed by an intersection of recess surfaces when viewed in a vertical transverse plane of the hull with said intersection disposed below a deck line of the hull.

73. The hull of claim 69 wherein the recess is composed of at least two substantially separate compartments that are separated by a divider member that extends over a majority of a length of the recess.

74. The hull of claim 69 wherein an element of the forward movable seal includes a side bead fastener whereby said side bead fastener slides into a track where said track is fastened to the hull and extends over a length of a rear portion of said seal element when said seal element is installed.

75. The hull of claim 69 wherein elements of said movable seal may be removed, with the boat waterborne, by on-board personnel through a forward deck opening, with said deck opening at least partially disposed in a portion of a deck that extends forwardly of a seal element.

76. The hull of claim 69 wherein the improvement comprises a hull shaped member that makes up a portion of said pressurized gas recess boundary.

77. The hull of claim 69 wherein the substantially rigid gas cushion aft seal member includes at least one substantially inverted V shape as formed by an intersection of recess surfaces when viewed in a vertical transverse plane of the hull with said intersection disposed below a deck line of the hull.

78. The hull of claim 69 which further includes an aft movable seal member.

79. The hull of claim 78 wherein said aft movable seal member, when viewed in at least one vertical transverse plane of the hull, contains surfaces that are angled to horizontal on its underside over a majority of its width.

80. The hull of claim 69 wherein the recess is composed of compartments that are separate over at least a majority of their length with at least one of the separate compartments having an aft movable seal member.

81. The hull of claim 69 which further comprises a forwardly extending bow member disposed, at least in part, forwardly of said gas cushion forward movable seal.

82. The forwardly extending bow member of claim 81 wherein said forwardly extending bow member is connected to a seal separator member that, at least in part, passes between elements of said gas cushion forward movable seal.

83. The seal separator member of claim 82 wherein said seal separator member has substantially parallel sides over at least a portion of its length that is proximal portions of said forward movable seal.

84. The forwardly extending bow member of claim 82 wherein said forwardly extending bow member has a bow like shape and is larger in cross section, as viewed in a vertical transverse plane of the hull that passes through said forwardly extending bow member, than the cross section of said seal separator member as viewed in a vertical transverse plane of the hull that passes through said seal separator element.

85. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:
a side bead fastener on an element of the forward movable seal whereby said side bead fastener slides into a track where said track is fastened to the hull and extends over a length of a rear portion of said side bead fastener, and wherein elements of said movable seal may be removed, with the hull waterborne, by on-board personnel, through a forward seal removal deck opening, with said seal element deck opening at least partially disposed in a portion of a deck that extends forwardly of a seal element and wherein there is deck structure proximal to and, at least in part, directly forward of said seal removal deck opening.

86. The improved boat hull of claim 85 wherein there is a forward movable seal element top cap attachment means that, at least in part, attaches a seal element to the hull.

87. The improved boat hull of claim 85 wherein said seal element further comprises attached structure proximal said forward movable seal element lower portions, said attached structure including a water contacting surface, and said attached structure being in in movable attachment with an attached structure on an adjacent seal element.

88. The improved boat hull of claim 85 wherein the improvement further comprises stabilizing load carrying catamaran like sidehulls where said sidehulls have keels that are substantially parallel to each other over at least part of their forward portions and said keels diverge aft of their forward portions.

89. The improved boat hull of claim 85 wherein the improvement further comprises stabilizing load carrying catamaran like sidehulls where said sidehulls have inside surfaces that are substantially parallel to each other over at least part of their forward portions that are proximal the forward movable seal.

90. The improved boat hull of claim 85 wherein the improvement further comprises a forwardly extending bow member that is disposed, at least in part, forwardly of said gas cushion forward movable seal.

91. The improved boat hull of claim 9 wherein said forwardly extending bow member is connected to a seal separator member that, at least in part, passes between elements of said gas cushion forward movable seal.

92. The improved boat hull of claim 91 wherein said separator of said forward movable seal elements has substantially parallel sides over at least a portion of its length that is proximal portions of said forward movable seal.

93. The improved boat hull of claim 85 which further includes a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

94. The hull of claim 85 which further includes at least one substantially rigid aft gas cushion sealing member, said sealing member including at least one substantially inverted V shape as formed by an intersection of recess surfaces when viewed in a vertical transverse plane of the hull with said intersection disposed below a deck line of the hull.

95. In an improved boat hull having a recess in its underside, said recess being pressurized with gas supplied by artificial means to create a restrained gas cushion between portions of the hull and a water surface, wherein said gas cushion is of sufficient pressure to support a significant portion of a weight of said boat hull, with a forward portion of said gas cushion restrained by a forward movable seal, the improvement comprising:
a side bead fastener on an element of the forward movable seal whereby said side bead fastener slides into a track where said track is fastened to the hull and extends over a length of a rear portion of said side bead fastener, and wherein there is a forward movable seal element top cap attachment means that, at least in part, attaches a seal element to the hull.

96. The improved boat hull of claim 95 wherein elements of said moveable seal may be removed, with the hull waterborne, by on-boardpersonnel, through a forward seal removal deck opening, with said seal element deck opening at least partially disposed in a portion of a deck that extends forwardly of a seal element and wherein there is deck structure proximal to and, at least in part, directly forward of said seal removal deck opening.

97. The improved boat hull of claim 95 wherein said seal elements further comprises attached structure proximal said forward movable seal element lower portions, said attached structure including a water cotacting surface, and said attached structure being in movable attachment with an attached structure on an adjacent seal element.

98. The improved boat hull of claim 95 wherein the improvement further comprises stabilizing load carrying catamaran like sidehulls where said sidehulls have inside surfaces that are substantially parallel to each other over at least part of their forward portions that are proximal the forward movable seal.

99. The improved boat hull of claim 95 wherein the improvement further comprises a forwardly extending bow member that is disposed, at least in part, forwardly of said gas cushion forward movable seal.

100. The improved boat hull of claim 95 wherein said forwardly extending bow member is connected to a seal separator member that, at least in part, passes between elements of said gas cushion forward movable seal and wherein said separator of said forward movable seal elements has substantially parallel sides over at least a portion of its length that is proximal portions of said forward movable seal.

101. The improved boat hull of claim 95 which further includes a substantially rigid gas cushion aft seal member wherein said aft seal member extends over a majority of recess width and said aft seal member's underside, when viewed in at least one vertical transverse plane of the hull, contains surfaces that are angled to horizontal over a majority of said aft seal member's width.

102. The improved boat hull of claim 95 which further includes a substantially rigid gas cushion aft seal member wherein said aft seal member includes at least one substantially inverted V shape as formed by an intersection of recess surfaces when viewed in a vertical transverse plane of the hull with said intersection disposed below a deck line of the hull.

* * * * *